(12) United States Patent
Shin et al.

(10) Patent No.: US 11,281,062 B2
(45) Date of Patent: Mar. 22, 2022

(54) DISPLAY APPARATUS

(71) Applicant: Samsung Display Co., LTD., Yongin-si (KR)

(72) Inventors: Dong Chul Shin, Hwaseong-si (KR); Kang Young Lee, Seongnam-si (KR); Hyun Sup Lee, Seoul (KR); Gye Hwan Lim, Incheon (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/892,228

(22) Filed: Jun. 3, 2020

(65) Prior Publication Data

US 2020/0393713 A1    Dec. 17, 2020

(30) Foreign Application Priority Data

Jun. 17, 2019    (KR) .................. 10-2019-0071322

(51) Int. Cl.
| | | |
|---|---|---|
| *G02F 1/1368* | (2006.01) | |
| *G02F 1/1335* | (2006.01) | |
| *G02F 1/1362* | (2006.01) | |
| *G02F 1/1343* | (2006.01) | |

(52) U.S. Cl.
CPC ........ *G02F 1/13685* (2021.01); *G02F 1/1368* (2013.01); *G02F 1/133514* (2013.01); *G02F 1/134372* (2021.01); *G02F 1/136286* (2013.01)

(58) Field of Classification Search
CPC ......... G02F 1/136227; G02F 1/133514; G02F 1/134372; G02F 1/136286; G02F 1/1368
See application file for complete search history.

(56) References Cited

U.S. PATENT DOCUMENTS

| | | | |
|---|---|---|---|
| 6,297,862 B1 | 10/2001 | Murade | |
| 6,812,912 B2 | 11/2004 | Miyajima et al. | |
| 10,394,091 B2 | 8/2019 | Lee et al. | |
| 2003/0076459 A1* | 4/2003 | Murade ............. | G02F 1/136209 349/111 |

(Continued)

FOREIGN PATENT DOCUMENTS

| | | |
|---|---|---|
| KR | 10-0501128 | 7/2005 |
| KR | 10-0516558 | 12/2005 |

(Continued)

OTHER PUBLICATIONS

Hyun Sup Lee, Large-area Ultra-high Density 5.36" 10Kx6K 2250 ppi Display, journal, pp. 607-609, 46-1, Display Research Center, Samsung Display, Republic of Korea.

*Primary Examiner* — Phu Vu
(74) *Attorney, Agent, or Firm* — H.C. Park & Associates, PLC

(57) ABSTRACT

A display apparatus may include a base substrate, an active pattern, a first electrode, a second electrode, a control electrode, and a display element. The active pattern may be disposed on the base substrate. The first electrode may be disposed between the base substrate and the active pattern and connected to a first end of the active pattern. The second electrode may be disposed on the active pattern and connected to a second end of the active pattern. The control electrode may overlap the active pattern and be insulated from the active pattern. The display element may be disposed on the second electrode and connected to the second electrode.

20 Claims, 17 Drawing Sheets

(56) References Cited

U.S. PATENT DOCUMENTS

| | | | |
|---|---|---|---|
| 2013/0162570 A1* | 6/2013 | Shin | G06F 3/0412 |
| | | | 345/173 |
| 2016/0300899 A1* | 10/2016 | Zhang | H01L 29/42384 |
| 2018/0120656 A1* | 5/2018 | Okada | G02F 1/13394 |
| 2019/0146293 A1* | 5/2019 | Xue | H01L 27/1244 |
| | | | 257/72 |
| 2020/0393713 A1* | 12/2020 | Shin | G02F 1/134372 |

FOREIGN PATENT DOCUMENTS

| | | |
|---|---|---|
| KR | 10-2017-0058475 | 5/2017 |
| KR | 10-2017-0126632 | 11/2017 |

* cited by examiner

DISPLAY APPARATUS

CROSS REFERENCE TO RELATED APPLICATIONS

This application claims priority from and the benefit of Korean Patent Application No. 10-2019-0071322, filed on Jun. 17, 2019, which is hereby incorporated by reference for all purposes as if fully set forth herein.

BACKGROUND

Field

Exemplary embodiments/implementations of the present invention relate generally to a display apparatus and, more specifically, to a display apparatus capable of realizing a high resolution.

Discussion of the Background

A high-resolution display apparatus has been a high demand. Also, a three-dimensional image overcoming a viewing angle limitation essentially requires the high-resolution display apparatus. Furthermore, the high-resolution display apparatus is also necessary for a head mount display, which requires a user to watch the display apparatus from a relatively close distance. In addition, the high-resolution display apparatus has been highly demanded for smartphones, televisions, notebook computers, and monitors.

However, there is a limitation in a thin-film transistor size reduction due to process equipment limitations for manufacturing the high-resolution display apparatus. Even though driving thin-film transistor size may be reduced, a performance does not meet a target.

The above information disclosed in this Background section is only for understanding of the background of the inventive concepts, and, therefore, it may contain information that does not constitute prior art.

SUMMARY

Exemplary embodiments of the present invention provide a high-resolution display apparatus.

Exemplary embodiments of the present invention also provide a display apparatus that minimizes a vertical crosstalk, improves a responding speed and/or luminance of a display element, and reduces a contact resistance between an active pattern and a second electrode.

An exemplary embodiment of the inventive concept provides a display apparatus including a base substrate, an active pattern, a first electrode, a second electrode, a control electrode, and a display element. The active pattern is disposed on the base substrate. The first electrode is disposed between the base substrate and the active pattern and connected to a first end of the active pattern. The second electrode is disposed on the active pattern and connected to a second end of the active pattern. The control electrode overlaps the active pattern and is insulated with the active pattern. The display element is disposed on the second electrode and connected to the second electrode.

The display apparatus may further include at least two insulation layers disposed between the second electrode and the first electrode.

The display apparatus may include first to fourth insulation layers. The first insulation layer may be disposed between the first electrode and the active pattern. The second insulation layer may be disposed between the active pattern and the control electrode. The third insulation layer may be disposed between the control electrode and the second electrode. The fourth insulation layer may be disposed between the second electrode and the display element.

The first electrode may contact the active pattern through a first contact hole defined in the first insulation layer. The second electrode may contact the active pattern through a second contact hole defined in the second and third insulation layers.

A thickness of the first insulation layer may be greater than the thickness of the first electrode.

The control electrode may be disposed on the active pattern.

The display apparatus may further include a first data line and a second data line, which are adjacent to each other in a first direction and each of which extends in a second direction crossing the first direction. The active pattern may overlap the first data line, may not overlap the second data line, and may extend between the first data line and the second data line.

The display apparatus may further include a gate line crossing the first data line and the second data line in an insulating manner. The gate line may be disposed at each of both sides of the second electrode in the first direction. The gate line may be disposed at one side of the second electrode and may not be disposed at the other side of the second electrode in the second direction.

The second electrode may be disposed between the first data line and the second data line.

The display element may include a pixel electrode, a reference electrode, and a liquid crystal layer. The pixel electrode may be connected to the second electrode. The reference electrode may overlap the pixel electrode in an insulating manner and receive a constant voltage. The liquid crystal layer may change an orientation state of liquid crystal molecules by a voltage applied to the pixel electrode and the reference electrode.

The display apparatus may further include an interlayer insulation layer disposed between the pixel electrode and the reference electrode. The pixel electrode may be disposed on the interlayer insulation layer. The liquid crystal layer may be disposed on the pixel electrode.

The display apparatus may further include a color filter disposed between the second electrode and the display element and overlapping the display element.

The display apparatus may further include a capping layer disposed between the color filter and the display element and covering the color filter.

The display apparatus may further include at least three insulation layers disposed between the second electrode and the first electrode.

Another exemplary embodiment of the present invention provides a display apparatus including a base substrate, an active pattern, a first electrode, a second electrode, a control electrode, insulation layers, and a display element. The active pattern is disposed on the base substrate. The first electrode is disposed on a different layer from the active pattern and connected to a first end of the active pattern. The second electrode is disposed on a different layer from the active pattern and the first electrode and connected to a second end of the active pattern. The control electrode overlaps the active pattern and is insulated from the active pattern. At least two insulation layers are disposed between the second electrode and the first electrode. The display element is disposed on the second electrode, and connected to the second electrode.

The second electrode may be disposed on the active pattern.

The first electrode may be disposed below the active pattern.

At least three insulation layers may be disposed between the second electrode and the first electrode.

Another exemplary embodiment of the present invention provides a display apparatus including a base substrate, an active pattern, a first electrode, a second electrode, a control electrode, a display element, and first to fourth insulation layers.

The active pattern is disposed on the base substrate. The first electrode is disposed on a different layer from the active pattern and connected to a first end of the active pattern. The second electrode is disposed on a different layer from the active pattern and the first electrode and connected to a second end of the active pattern. The control electrode overlaps the active pattern and is insulated with the active pattern. The display element is disposed on the second electrode and connected to the second electrode.

The first insulation layer is disposed between the first electrode and the active pattern. The second insulation layer is disposed between the active pattern and the control electrode. The third insulation layer is disposed between the control electrode and the second electrode. The fourth insulation layer is disposed between the second electrode and the display element.

The control electrode may be disposed on the active pattern.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
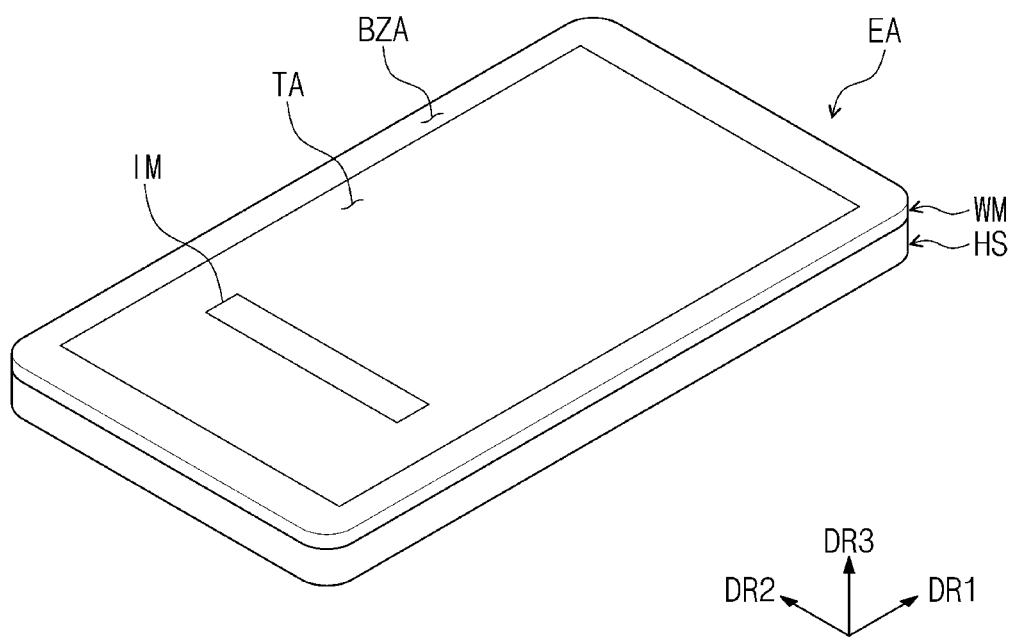
FIG. 1 is a plan/perspective view of a display apparatus constructed according to an exemplary embodiment of the invention.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereinafter, embodiments of the inventive concept will be described with reference to the accompanying drawings.

Figure 2:
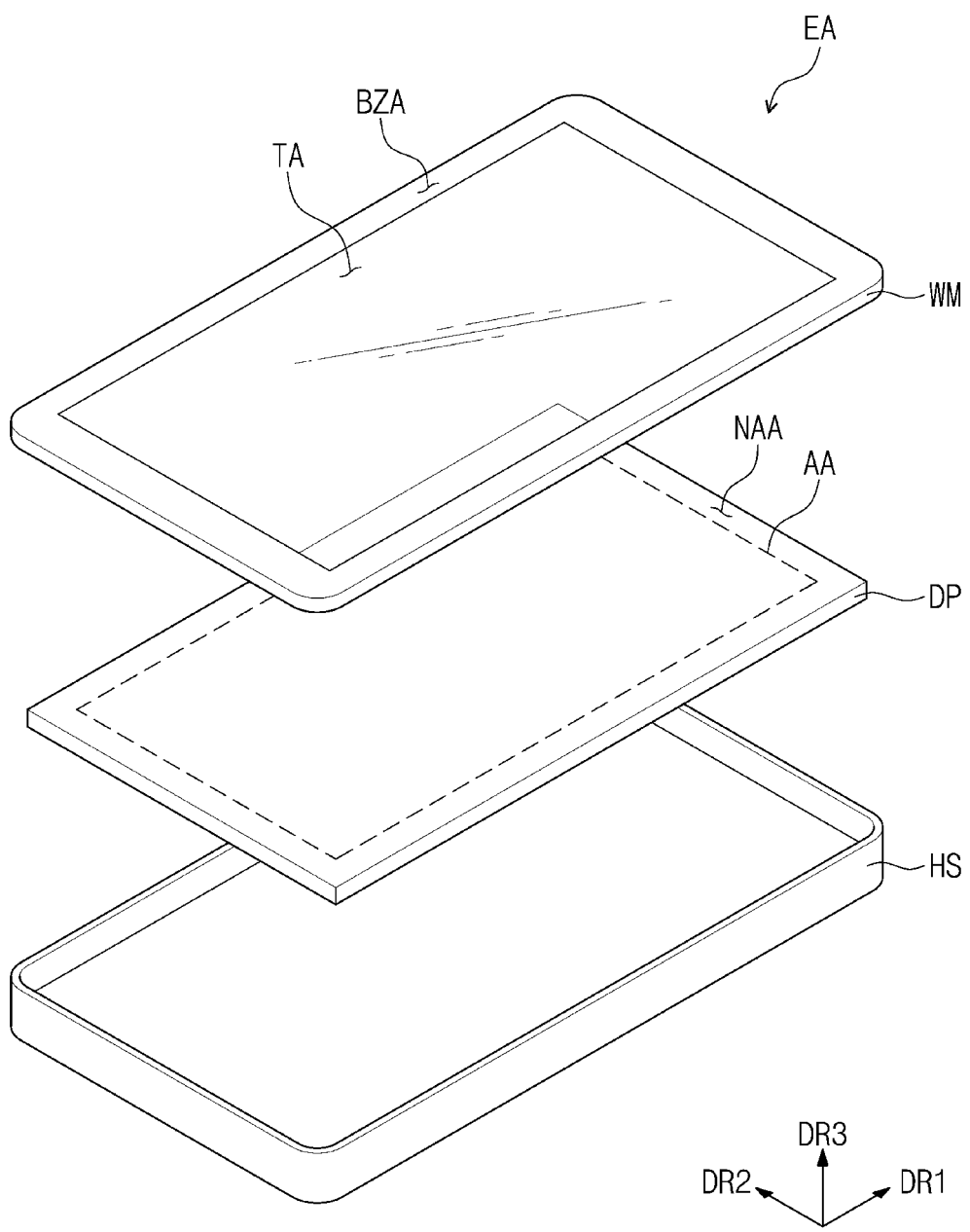
FIG. 2 is an exploded perspective view illustrating the display apparatus in FIG. 1.

FIG. 1 is a perspective view illustrating a display apparatus according to an embodiment of the inventive concept, and FIG. 2 is an exploded perspective view illustrating the display apparatus in FIG. 1.

Referring to FIGS. 1 and 2, a display apparatus EA may be activated according to an electrical signal. The display apparatus EA may include various embodiments. For example, the display apparatus EA may include a tablet PC, a notebook computer, a personal computer, a smart TV, and a smartphone.

The display apparatus EA may display an image IM on a front surface thereof. The front surface may be defined in parallel to a plane defined by a first direction DR1 and a second direction DR2.

The front surface of the display apparatus EA includes a transmission area TA and a bezel area BZA disposed adjacent to the transmission area TA. The display apparatus EA displays an image IM on the transmission area TA. The transmission area TA may have a rectangular shape in parallel to each of the first direction DR1 and the second direction DR2. However, the embodiment of the inventive concept is not limited thereto. For example, the transmission area TA may have various shapes.

The bezel area BZA is disposed adjacent to the transmission area TA. The bezel area BZA may surround the transmission area TA. However, the embodiment of the inventive concept is not limited thereto. For example, the bezel area BZA may be disposed adjacent to only one side of the transmission area TA, or omitted. Although the display device according to an embodiment of the inventive concept may include various embodiments, the embodiment of the inventive concept is not limited thereto.

A normal direction of the front surface may correspond to a thickness direction DR3 (hereinafter, referred to as a third direction) of the display apparatus EA. In the embodiment, a front surface (or top surface) and a rear surface (or bottom surface) of each of members are defined on the basis of a direction of displaying the image IM. The front surface and the rear surface are opposite to each other in the third direction DR3.

Also, directions indicated by the first to third directions DR1 to DR3 may be a relative concept, and converted with respect to each other. Hereinafter, first to third directions may be indicated by the first to third directions DR1, DR2, and DR3 and designated by the same reference numerals, respectively.

The display apparatus EA may include a window member WM, a display panel DP, and an accommodation member HS.

The window member WM provides the front surface of the display apparatus EA. The window member WM may be disposed on the front surface of the display panel DP to protect the display panel. For example, the window member WM may include a glass substrate, a sapphire substrate, or a plastic film. The window member WM may have a multilayer or single layer structure. For example, the window member WM may have a laminated structure in which a plurality of plastic films are coupled by means of an adhesive agent or a laminated structure in which a glass substrate and a plastic film are coupled by means of an adhesive agent.

The window member WM may be divided into a transmission area TA and a bezel area BZA. The transmission area TA may transmit incident light. The transmission area TA may have a shape corresponding to an active area AA. For example, the transmission area TA overlaps a whole or at least a portion of the active area AA. The image IM displayed on the active area AA of the display panel DP may be seen from the outside through the transmission area TA.

The bezel area BZA may have a relatively lower light transmittance than that of the transmission area TA. The bezel area BZA defines a shape of the transmission area TA. The bezel area BZA may be disposed adjacent to the transmission area TA and surround the transmission area TA.

The bezel area BZA may have a predetermined color. The bezel area BZA may cover a peripheral area NAA of the display panel DP to block the peripheral area NAA from being seen from the outside. However, the embodiment of the inventive concept is not limited thereto. For example, the bezel area BZA may be omitted from the window member WM according to an embodiment of the inventive concept.

The accommodation member HS may be coupled to the window member WM. The accommodation member HS provides a rear surface of the display apparatus EA. The accommodation member HS is coupled to the window member WM to define an inner space.

The accommodation member HS may contain a material having a relatively high rigidity. For example, the accommodation member HS may include a plurality of frames and/or plates, which are made of glass, plastic, or metal. The accommodation member HS may stably protect components of the display apparatus EA accommodated in the inner space from an external impact. In the inner space provided by the accommodation member HS, the display panel DP and all sorts of components, e.g., a main board, a communication module, and a battery, may be accommodated.

The display panel DP may be disposed below the window member WM and accommodated in the accommodation member HS.

The display panel DP may include an organic light emitting display panel, a liquid crystal display panel, a plasma display panel, an electrophoretic display panel, a microelectromechanical (MEMS) system display panel, and an electrowetting display panel.

The display panel DP may include an active area AA and a peripheral area NAA, which are distinguished on a plane. The active area AA may display the image IM according to an electric signal. The peripheral area NAA may be covered by the bezel area BZA. The peripheral area NAA is disposed adjacent to the active area AA. The peripheral area NAA may surround the active area AA. In the peripheral area NAA, a driving circuit or line for driving the active area AA may be disposed.

Figure 3:
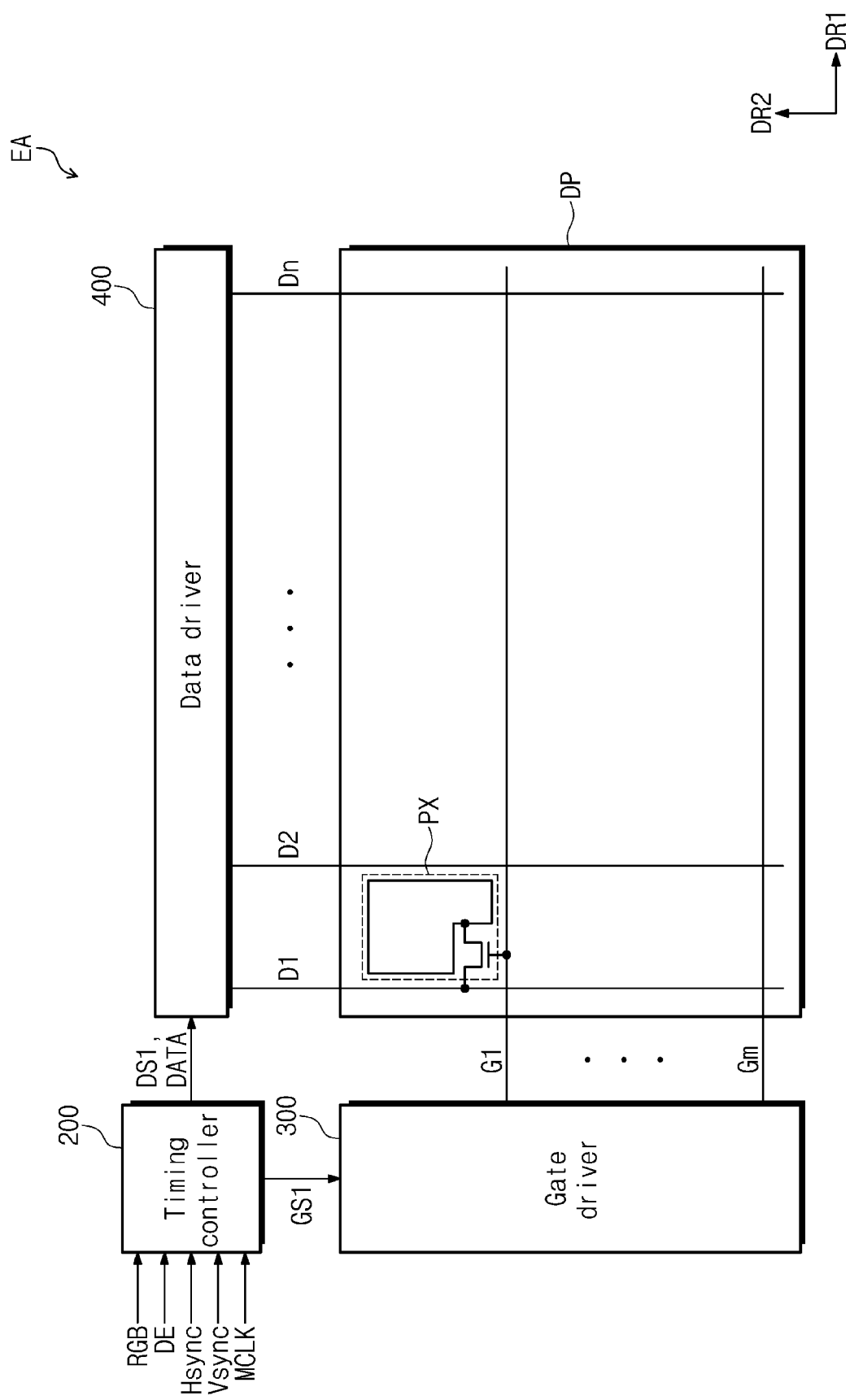
FIG. 3 is a block diagram illustrating a portion of the display apparatus in FIG. 2.

FIG. 3 is a block diagram illustrating a portion of the display apparatus in FIG. 2.

In an embodiment of the inventive concept, the display panel DP will be exemplarily described as the liquid crystal display panel.

The display apparatus EA may further include a timing controller 200, a gate driver 300, and a data driver 400 in addition to the display panel DP.

The display panel DP may include a plurality of gate lines G1 to Gm, a plurality of data lines D1 to Dn, and a display element PX.

The gate lines G1 to Gm extend while being spaced apart from each other. The data lines D1 to Dn cross the gate lines G1 to Gm and extend while being spaced apart from each other. The display element PX is connected to the gate lines G1 to Gm and the data lines D1 to Dn to display an image.

The timing controller 200 receives image data RGB and a control signal from an external graphic control unit (not shown). The control signal may include a vertical synchronization signal (hereinafter, referred to as a 'Vsync signal') that is a frame distinguishing signal, a horizontal synchronization signal (hereinafter, referred to as a 'Hsync signal') that is a row distinguishing signal, a data enable signal (hereinafter, referred to as a 'DE signal') having a specific signal level during an interval in which data are outputted in order to display an area in which data are entered, and a main clock signal MCLK.

The timing controller 200 converts the image data RGB to be fit to a specification of the data driver 400 and outputs the converted image data DATA to the data driver 400. The timing controller 200 generates a gate control signal GS1 and a data control signal DS1. The timing controller 200 outputs the gate control signal GS1 to the gate driver 300, and outputs the data control signal DS1 to the data driver 400.

The gate control signal GS1 is a signal for driving the gate driver 300, and the data control signal DS1 is a signal for driving the data driver 400.

The gate driver 300 generates a gate signal on the basis of the gate control signal GS1 and outputs the gate signal to the gate lines G1 to Gm. The gate control signal GS1 may include an injection initiation signal commanding injection initiation, at least one clock signal controlling an output frequency of a gate-on voltage, and an output enable signal restricting a maintaining time of the gate-on voltage.

The data driver 400 generates a gradation voltage according to the image data DATA on the basis of the data control signal DS1 and outputs the generated gradation voltage as a data voltage to the data lines D1 to Dn.

Each of the timing controller 200, the gate driver 300, and the data driver 400 may be directly mounted to the display panel DP in the form of at least one integrated circuit chip, mounted to a flexible printed circuit board and attached to a liquid crystal panel 100 in the form of a tape carrier package (TCP), or mounted to a separate printed circuit board. Alternatively, at least one of the gate driver 300 and the data driver 400 may be integrated to the liquid crystal panel 100 in conjunction with the gate lines G1 to Gm and the data lines D1 to Dn. Although not shown, thin-film transistors may be integrated to the liquid crystal panel 100 in conjunction with the gate lines G1 to Gm and the data lines D1 to Dn. Also, the timing controller 200, the gate driver 300, and the data driver 400 may be integrated into a single chip.

Figure 4:
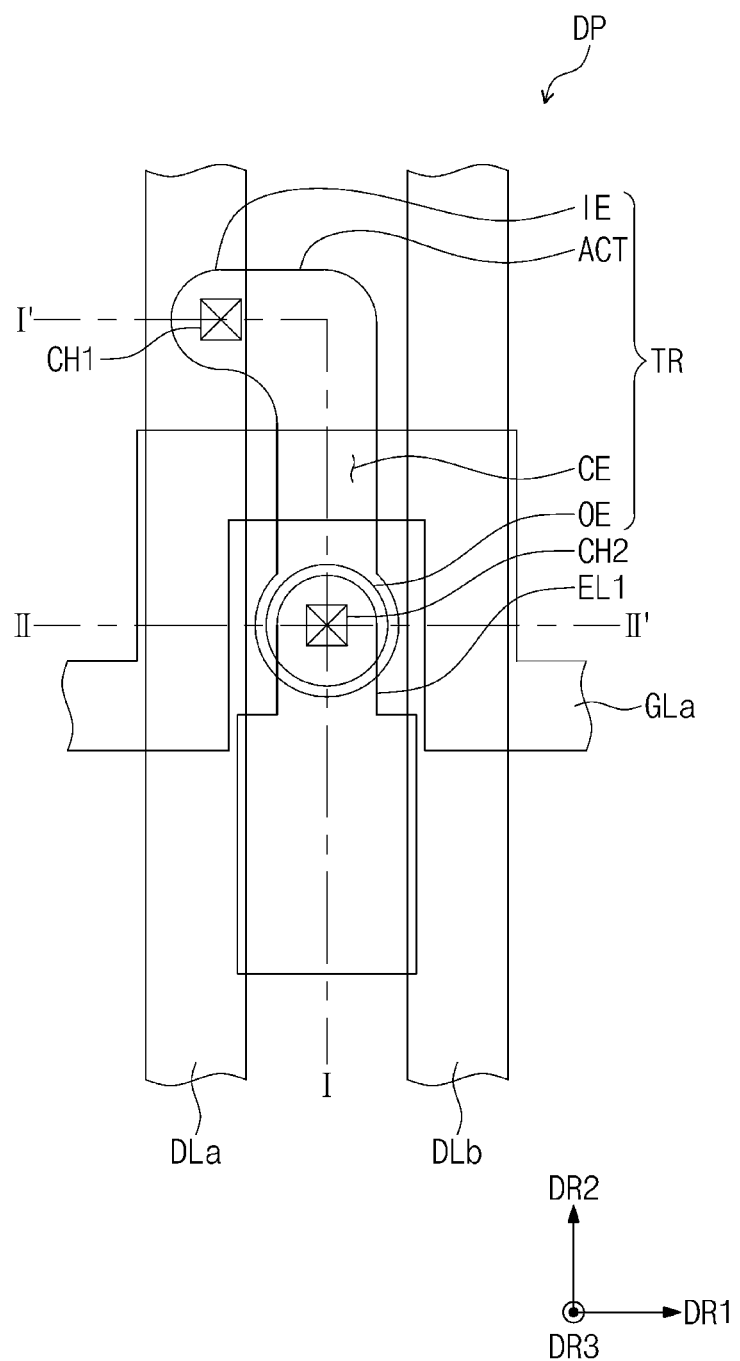
FIG. 4 is an enlarged plan view illustrating a portion of a display panel according to an embodiment of the inventive concept.
Figure 5:
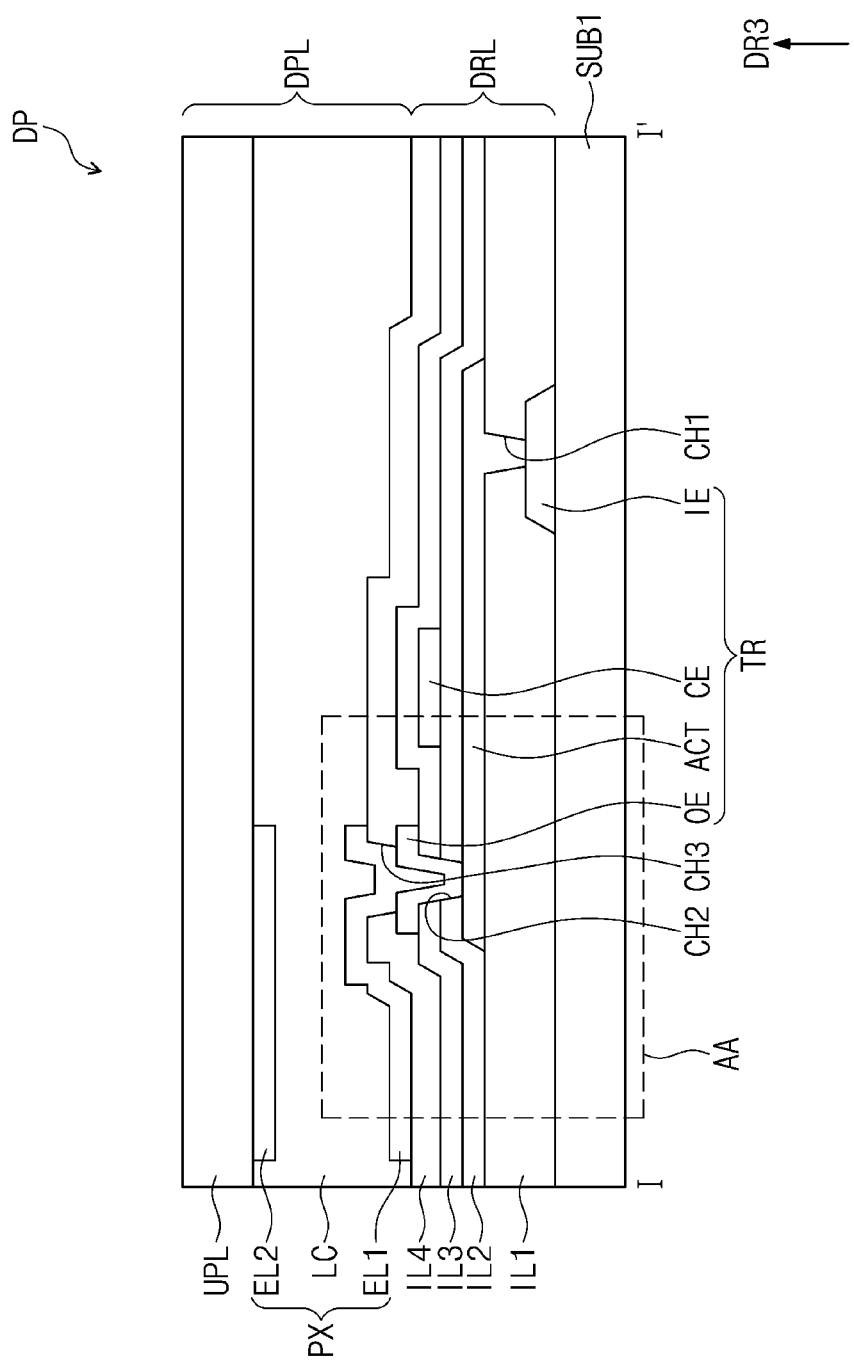
FIG. 5 is a cross-sectional view taken along line I-I' of FIG. 4.
Figure 6:
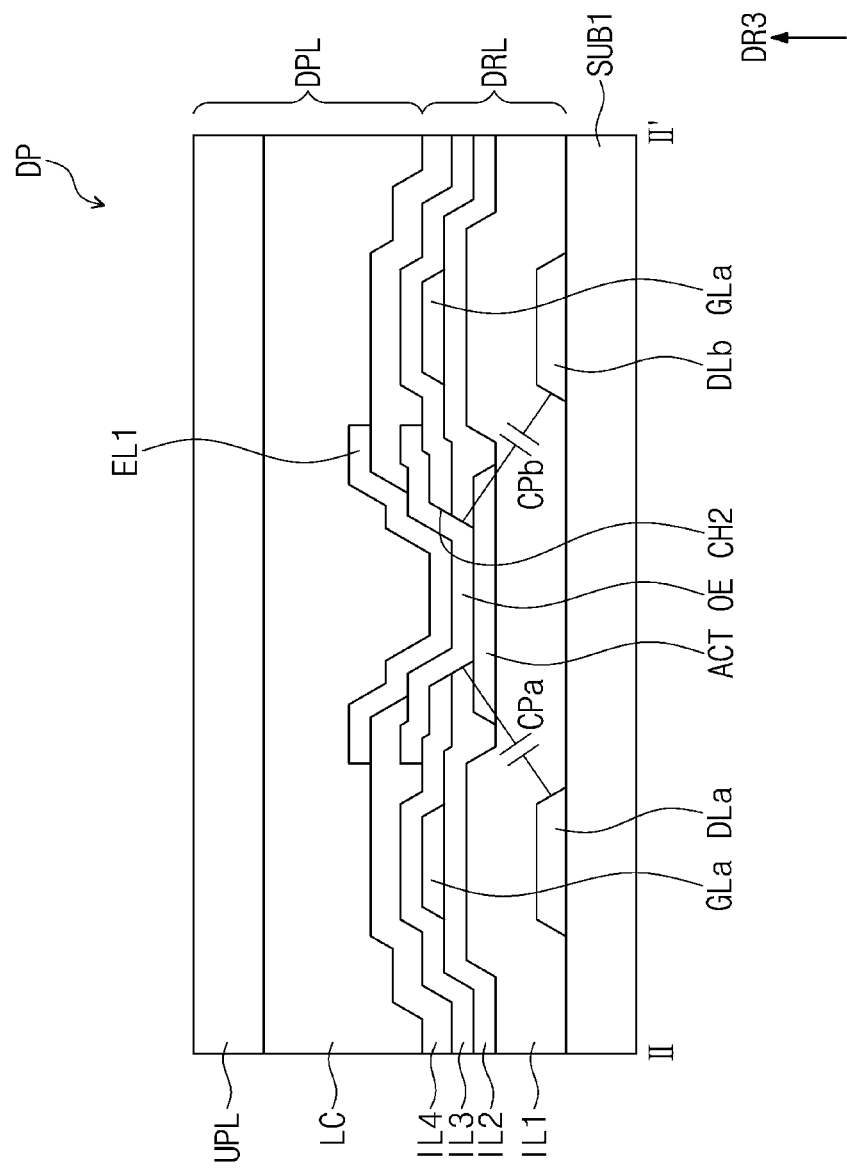
FIG. 6 is a cross-sectional view taken along line II-II' of FIG. 4.

FIG. 4 is an enlarged plan view illustrating a portion of the display panel according to an embodiment of the inventive concept, FIG. 5 is a cross-sectional view taken along line I-I' of FIG. 4, and FIG. 6 is a cross-sectional view taken along line II-II' of FIG. 4.

FIG. 4 illustrates an area on which one display element PX in FIG. 3 is disposed.

The display panel DP may include a base substrate SUB1, a driving element layer DRL, and a display element layer DPL.

The base substrate SUB1 may be an insulating substrate. Although the base substrate SUB1 may include various materials such as glass or plastic, the embodiment of the inventive concept is not limited thereto.

The driving element layer DRL is disposed on the base substrate SUB1. The driving element layer DRL may include the gate lines G1 to Gm, the data lines D1 to Dn, and the thin-film transistor TR, which are described with reference to FIG. 3.

In FIG. 4, two data lines DLa and DLb, which are adjacent to each other, one gate line GLa, and a thin-film transistor TR are exemplarily illustrated.

Each of the two adjacent data lines DLa and DLb extends in the second direction DR2. The display panel DP described in the embodiment may be a high-resolution display panel in which a distance between the adjacent data lines DLa and DLb in the first direction DR1 is about 5 μm or less.

The gate line GLa may basically extend in the first direction DR1, but may have a partially bent portion in an area overlapping the data lines DLa and DLb. The gate line GLa and the data lines DLa and DLb may be disposed on different layers from each other.

The thin-film transistor TR may be connected to one data line DLa and one gate line GLa, and the display element PX of the display element layer DPL may be driven by the data line DLa and the gate line GLa.

The thin-film transistor TR may include a first electrode IE, a second electrode OE, an active pattern ACT, and a control electrode CE. Also, the driving element layer DRL may include insulation layers disposed between the first electrode IE, the second electrode OE, the active pattern ACT, and the control electrode CE, and, in an embodiment of the inventive concept, first to fourth insulation layers IL1, IL2, IL3, and IL4 may be provided.

The first electrode IE may be disposed on the base substrate SUB1. The first electrode IE may be connected to a first end of the active pattern ACT. The first electrode IE may be defined as one portion of the data line DLa. However, the embodiment of the inventive concept is not limited thereto. For example, the first electrode IE may have a shape protruding from the data line DLa. The first electrode IE may have a structure having a plurality of layers, e.g., a sequentially laminated structure of Ti/Al/Ti.

The first insulation layer IL1 may be disposed on the first electrode IE. The first insulation layer IL1 may include a silicon oxide or a silicon nitride. The thickness of first insulation layer IL1 may be greater than the thickness of the first electrode IE. As described below, when the first insulation layer IL1 is thicker than that of the first electrode IE, parasitic capacitors CPa and CPb between the second electrode OE and the first electrode IE are easily controlled to have a relatively small capacitance.

The active pattern ACT may extend from the first electrode IE in the first direction DR1, and be bent to extend in the second direction DR2 between the adjacent data lines DLa and DLb. The active pattern ACT may overlap one data line DLa of the adjacent data lines DLa and DLb and may not overlap the other data line DLb.

The active pattern ACT may be disposed on the first insulation layer IL1. The active pattern ACT may include one of amorphous silicon, polysilicon, and an oxide semiconductor. The active pattern ACT may have a first end contacting the first electrode IE through a first contact hole CH1 provided in the first insulation layer IL1.

The second insulation layer IL2 may be disposed on the active pattern ACT. The second insulation layer IL2 may insulate the active pattern ACT from the control electrode CE. The second insulation layer IL2 may include a silicon oxide or a silicon nitride.

The control electrode CE may be disposed on the second insulation layer IL2. The control electrode CE may be defined as a portion of the gate line GLa. However, the embodiment of the inventive concept is not limited thereto. For example, the control electrode CE may have a shape protruding from the gate line GLa. The control electrode CE may overlap the active pattern ACT.

Although the control electrode CE is exemplarily disposed on the active pattern ACT in the embodiment, the embodiment of the inventive concept is not limited thereto. For example, the control electrode CE may be disposed below the active pattern ACT.

The third insulation layer IL3 may be disposed on the control electrode CE. The third insulation layer IL3 may include a silicon oxide or a silicon nitride.

The second electrode OE may be disposed between the adjacent data lines DLa and DLb. The gate line GLa may have an opened shape surrounding the second electrode OE. That is, the gate line GLa may be disposed at both sides of the second electrode OE in the first direction DR1, and the gate line GLa may be disposed at one side of the second electrode OE in the second direction DR2 and may not be disposed at the other side.

The second electrode OE may be disposed on the third insulation layer IL3. The second electrode OE may be disposed on a different layer from the first electrode IE, the active pattern ACT, and the control electrode CE. The second electrode OE may contact a second end of the active pattern ACT through a second contact hole CH2 defined in the second and third insulation layers IL2 and IL3.

The fourth insulation layer IL4 may be disposed on the second electrode OE. The fourth insulation layer IL4 may include a silicon oxide or a silicon nitride.

High-resolution display devices decrease the distance between the adjacent data lines DLa and DLb. When the second electrode OE is disposed on the same layer as the first electrode IE, the second electrode OE is required to be spaced apart from the first electrode IE, and a space for the second electrode OE arrangement gets narrower when considering a process margin. In an embodiment of the inventive concept, the driving element layer DRL for realizing the high-resolution display device may be provided by differentiating layer structures of the first electrode IE and of the second electrode OE.

Figure 7:
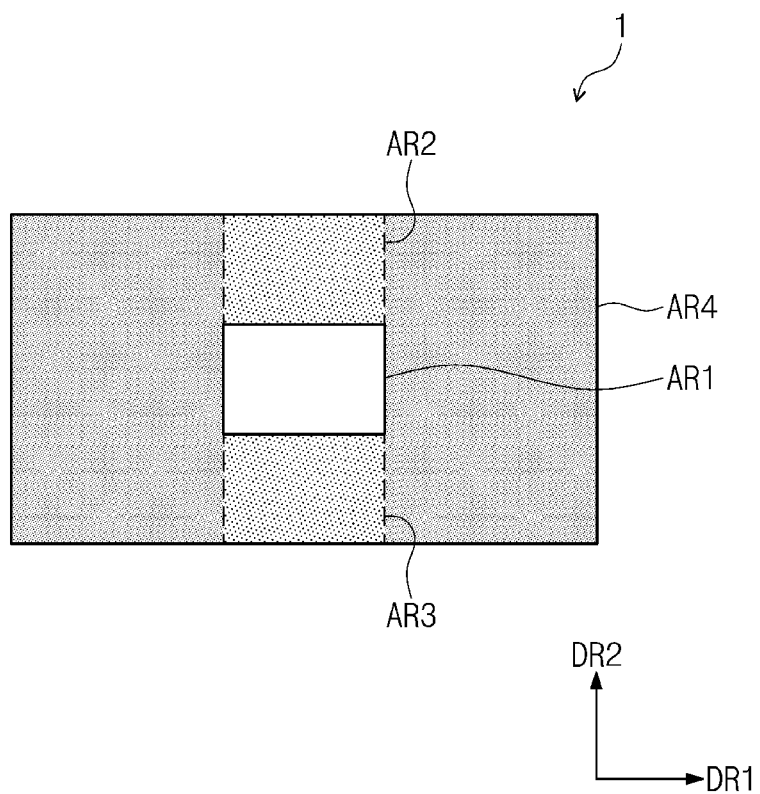
FIG. 7 is a schematic view illustrating a display panel in which a vertical crosstalk is generated.

FIG. 7 is a schematic view illustrating a display panel that shows a vertical crosstalk.

In FIG. 7, data corresponding to a white image is outputted to display elements disposed on a first area AR1 of a display panel 1, and data corresponding to a black image is outputted to display elements disposed on the rest area except for the first area AR1.

When a data line of the display panel 1 extends in the second direction DR2, display elements disposed on a second area AR2 and a third area AR3, which are adjacent to the first area AR1 in the second direction DR2, share the data lines with the display element disposed on the first area AR1. An electric potential of a pixel electrode of the display elements disposed on the second area AR2 and the third area AR3 may increase by white data applied to the display element disposed on the first area AR1, and thus each of the second area AR2 and the third area AR3 may display a gray image having a color between white and black. Here, a fourth area AR4, which does not share the data line with the display elements disposed on the first area AR1, may display a black image. Such phenomenon may be defined as the vertical crosstalk.

Unlike the embodiment of the inventive concept, either when the first electrode and the second electrode are disposed on the same layer or when only one insulation layer is disposed between the first electrode and the second electrode, due to a relatively close distance between the first electrode and the second electrode, a parasitic capacitance between the first electrode and the second electrode may further increase, increasing the vertical crosstalk.

Referring to FIGS. 4 to 6 again, in an embodiment of the inventive concept, parasitic capacitors CPa and CPb may be provided between the data lines DLa and the second electrode OE. First to third insulation layers IL1, IL2, and IL3 may be disposed between the second electrode OE and the data lines DLa and DLb. In an embodiment of the inventive concept, unlike a comparative example, the plurality of insulation layers disposed between the second electrode OE and the first electrode IE may control the capacitance of the parasitic capacitors CPa and CPb to be relatively small, minimizing the vertical crosstalk phenomenon.

In general, as a capacitance of a capacitor Cgs provided between the control electrode and the first electrode increases, a RC delay value of a signal applied through the transistor increases.

Unlike the embodiment of the inventive concept, when one insulation layer is disposed between the control electrode and the first electrode, a reduced distance between the control electrode and the first electrode may relatively increase the capacitance of the capacitor provided between the control electrode and the first electrode. Thus, a RC delay value of a signal applied to the pixel electrode of the display element through the thin-film transistor may increase, and a responding speed or luminance may be insufficient in comparison with a target value.

In an embodiment of the inventive concept, the first insulation layer IL1 and the second insulation layer IL2 may be disposed between the control electrode CE and the first electrode IE. In an embodiment of the inventive concept, unlike the comparative example, as the plurality of insulation layers are disposed between the control electrode CE and the first electrode IE, a RC delay value of a signal applied to a pixel electrode EL1 of the display element may relatively decrease, and a responding speed and/or luminance may improve.

The display element layer DPL is disposed on the driving element layer DRL.

The display element layer DPL may include a plurality of pixels PX. In an embodiment of the inventive concept, the display element PX may be a liquid crystal display element. However, the embodiment of the inventive concept is not limited thereto. For example, in another embodiment of the inventive concept, the display element PX may be an organic light emitting display element.

The display element PX may include a pixel electrode EL1, a reference electrode EL2, and a liquid crystal layer LC.

The pixel electrode EL1 may be connected to the second electrode OE through a third contact hole CH3 defined in the fourth insulation layer IL4. The pixel electrode EL1 and the reference electrode EL2 may be insulated from each other while facing each other. Each of the pixel electrode EL1 and the reference electrode EL2 may include a transparent conductive material. The pixel electrode EL1 may receive a voltage applied through the thin-film transistor TR, and the reference electrode EL2 may receive a constant common voltage.

The liquid crystal layer LC includes liquid crystal molecules. Light incident from below the display element layer DPL may be transmitted or blocked by changing an orientation state of the liquid crystal molecules by the voltage applied to the pixel electrode EL1 and the reference electrode EL2. In an embodiment of the inventive concept, the liquid crystal layer LC may be exemplarily illustrated between the pixel electrode EL1 and the reference electrode EL2.

The display element layer DPL may further include an upper layer UPL. The upper layer UPL may serve to protect the display element PX or be one component of the display element PX, e.g., a base substrate on which the reference electrode EL2 is disposed. The upper layer UPL may have various shapes and include various materials as long as the upper layer UPL is made of an insulating material.

Figure 8A:
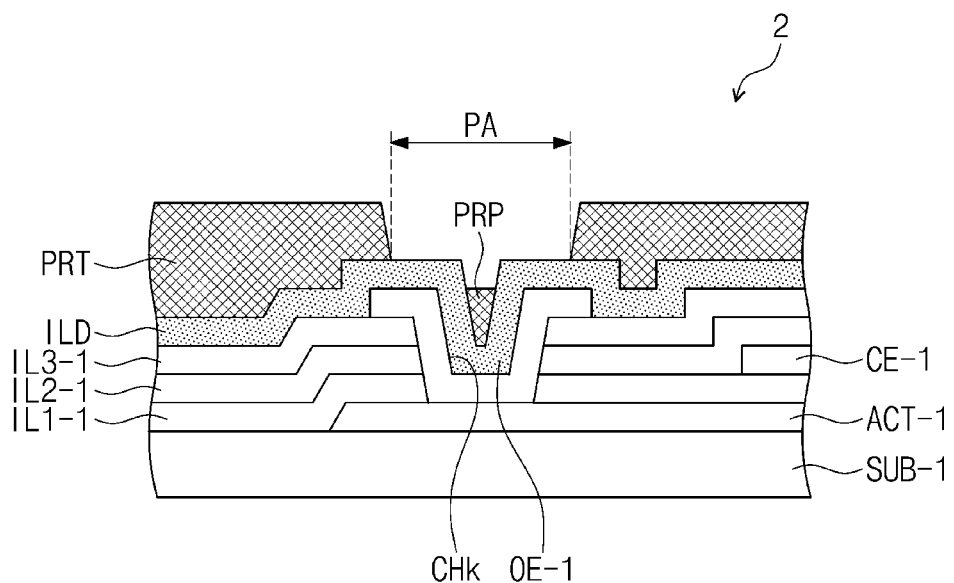
FIGS. 8A to 8C are cross-sectional views illustrating a portion of a process of forming a structure of a region, which corresponds to region AA of FIG. 5, in a display panel according to a comparative example.
Figure 8B:
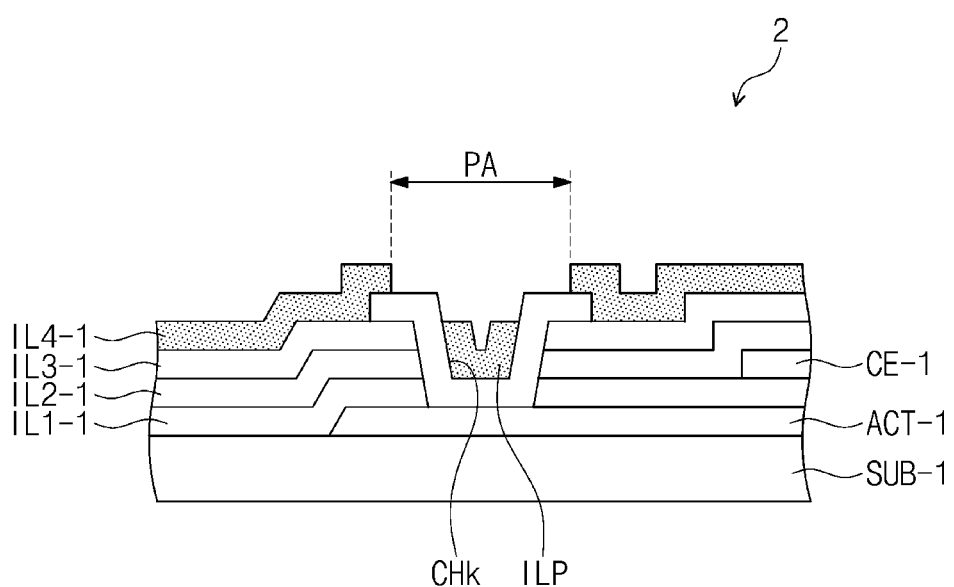
Figure 8C:
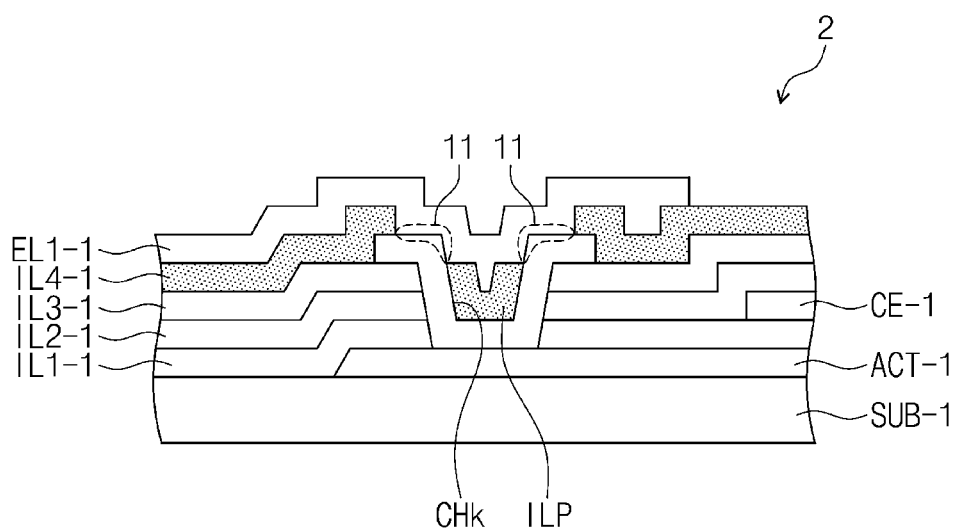

FIGS. 8A to 8C are cross-sectional views illustrating a portion of a process of forming a structure of a region, which corresponds to region AA of FIG. 5, in a display panel according to a comparative example. An effect of the display device according to an embodiment of the inventive concept will be described through a manufacturing process of the comparative example in FIGS. 8A to 8C.

Reference numerals of components of a display panel 2 according to the comparative example in FIGS. 8A to 8C are displayed by adding "-1" to the reference numerals of the corresponding components of the display panel DP described with reference to FIGS. 4 to 6.

In the display panel 2 of FIGS. 8A to 8C, a control electrode CE-1 may be disposed on an active pattern ACT-1, and a second electrode OE-1 may be disposed on the control electrode CE-1. The second electrode OE-1 is connected to the active pattern ACT-1 through a contact hole CHk. Although not shown, a first electrode is disposed between the control electrode CE-1 and the second electrode OE-1, i.e., between a second insulation layer IL2-1 and a third insulation layer IL3-1.

Referring to FIG. 8A, the second electrode OE-1 is formed, and then an insulation layer ILD is formed on the entire second electrode OE-1. Thereafter, a photosensitive film is applied on the insulation layer ILD in order to pattern the insulation layer ILD. Thereafter, a photosensitive pattern PRT is formed by exposing and removing the photosensitive film disposed on a contact area PA for contact with a pixel electrode EL1-1. Here, a valley is defined in the second electrode OE-1 and the insulation layer ILD, which cover the contact hole CHk, and since an exposure amount is insufficient, the photosensitive film in the valley of the insulation layer ILD is not removed, and thus the residual photosensitive film PRP may be remained.

Thereafter, referring to FIG. 8B, as the insulation layer ILD is etched by using the photosensitive pattern PRT and the residual photosensitive pattern PRP as a mask, a fourth insulation layer IL4-1 and a residual insulation layer ILP are formed.

Thereafter, referring to FIG. 8C, a pixel electrode EL1-1 is formed on the fourth insulation layer IL4-1 and the residual insulation layer ILP. The pixel electrode EL1-1 contacts a portion 11 of a top surface of the second electrode OE-1, which is exposed by the residual insulation layer ILP and the fourth insulation layer IL4-1. Due to the residual insulation layer ILP, a contact area between the second electrode OE-1 and the pixel electrode EL1-1, and a contact resistance between the second electrode OE-1 and the pixel electrode EL1-1 increases.

Referring to FIGS. 5 and 6 again, in the display panel DP according to an embodiment of the inventive concept, since the second contact hole CH2 contacting the second electrode OE and the active pattern ACT has a depth less than that of the contact hole CHk described with reference to FIGS. 8A to 8C, a contact area between the active pattern ACT and the second electrode OE may increase, and a contact resistance may decrease.

Figure 9:
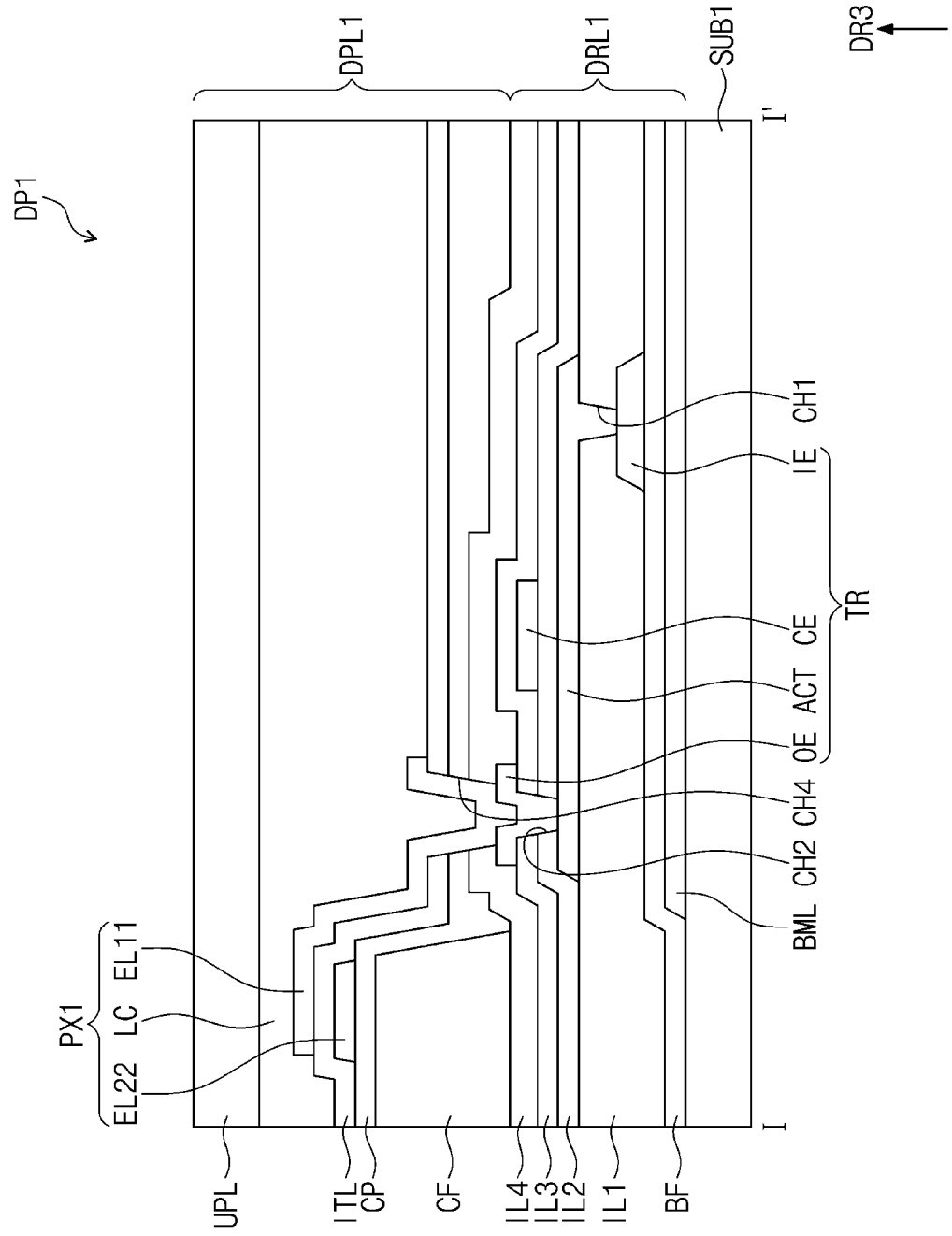
FIG. 9 is a cross-sectional view taken along line I-I' of FIG. 4 in a display panel according to another embodiment of the inventive concept.
Figure 10:
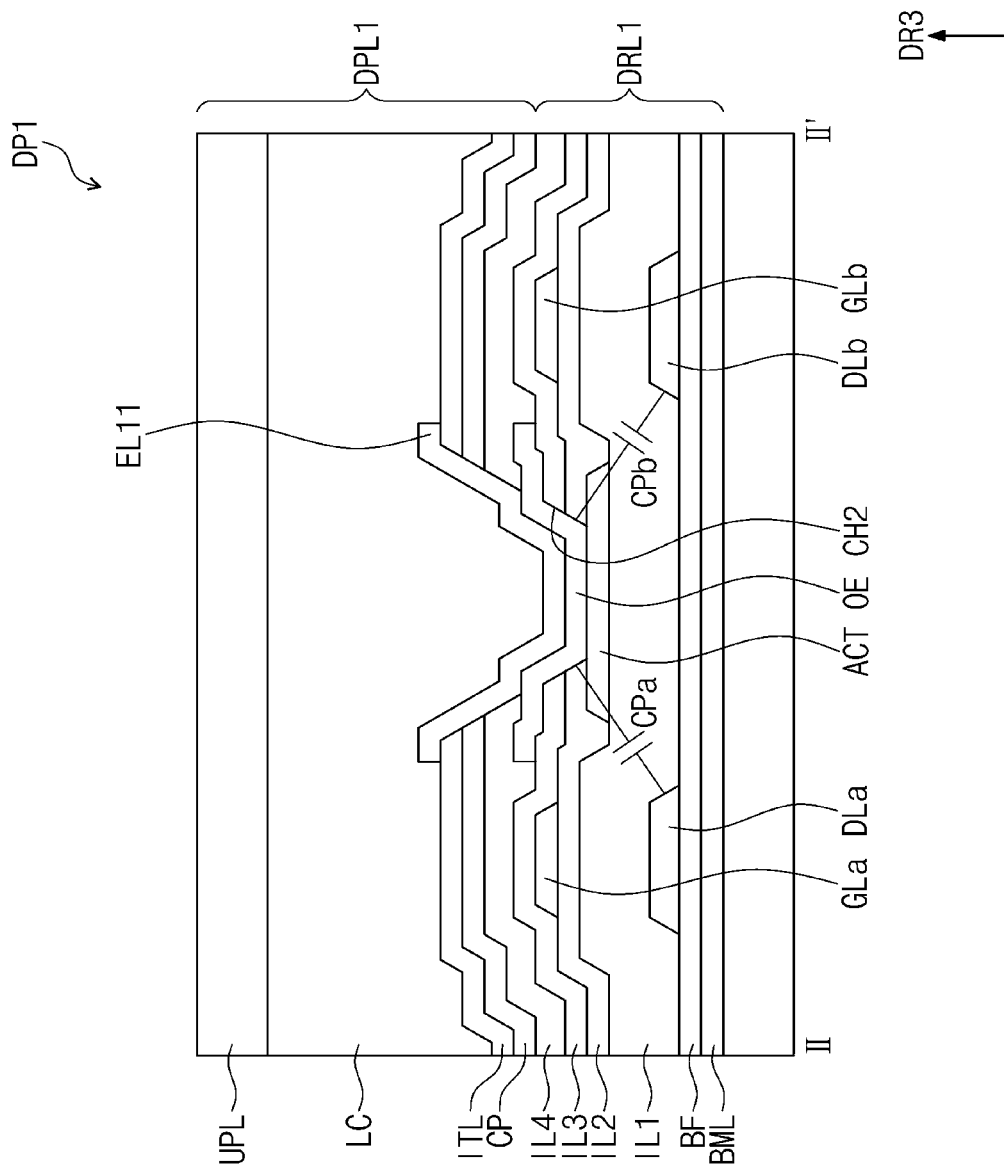
FIG. 10 is a cross-sectional view taken along line II-II' in FIG. 4 of the display panel according to another embodiment of the inventive concept.

FIG. 9 is a cross-sectional view taken along line I-I' of FIG. 4 in a display panel according to another embodiment of the inventive concept, and FIG. 10 is a cross-sectional view taken along line II-II' of FIG. 4 in the display panel according to another embodiment of the inventive concept.

A display panel DP1 described with reference to FIGS. 9 and 10 will be mainly described in terms of a different point from the display panel DP described with reference to FIGS. 5 and 6, and components that are not described will be designated by the same reference numerals and detailed description for the components will be omitted.

A driving element layer DRL1 of the display panel DP1 may further include a light shielding layer BML and a buffer layer BF.

The light shielding layer BML may be disposed between a base substrate SUB1 and a first electrode IE. The light shielding layer BML may overlap a thin-film transistor TR and may not overlap a display element PX1.

The light shielding layer BML may block light incident from below the base substrate SUB1. The light shielding layer BML may include a material that reflects or block the incident light.

The buffer layer BF may be disposed on the light shielding layer BML and disposed below the first electrode IE. The buffer layer BF may improve a coupling force between the base substrate SUB1 and layers disposed thereabove.

The display panel DP1 may further include a color filter CF.

The color filter CF may be disposed between the driving element layer DRL1 and the display element layer DPL1.

The color filter CF may overlap a pixel electrode EL1 and a reference electrode EL2. The color filter CF may include an organic material having a color such as red, green, or blue and serve to transmit light in a specific wavelength band of light incident to the display element PX.

The display element layer DPL1 may further include a capping layer CP and an interlayer insulation layer ITL.

The capping layer CP may be disposed on the fourth insulation layer IL4 and the color filter CF. The capping layer CP may be disposed below the display element PX1.

The capping layer CP covers the color filter CF. The capping layer CL may include an insulating material.

The display element PX1 may include a pixel electrode EL11, a reference electrode EL22, and a liquid crystal layer LC.

The reference electrode EL22 may be disposed on the capping layer CP.

The interlayer insulation layer ITL may be disposed between the pixel electrode EL11 and the reference electrode EL22. The interlayer insulation layer ITL may include a silicon oxide or a silicon nitride.

The pixel electrode EL11 may be disposed on the interlayer insulation layer ITL and the reference electrode EL22. The pixel electrode EL11 may be connected to the second electrode OE through a fourth contact hole CH4 defined in the fourth insulation layer IL4, the capping layer CP, and the interlayer insulation layer ITL.

The liquid crystal layer LC may be disposed on the pixel electrode EL11 and below an upper layer UPL.

Figure 11:
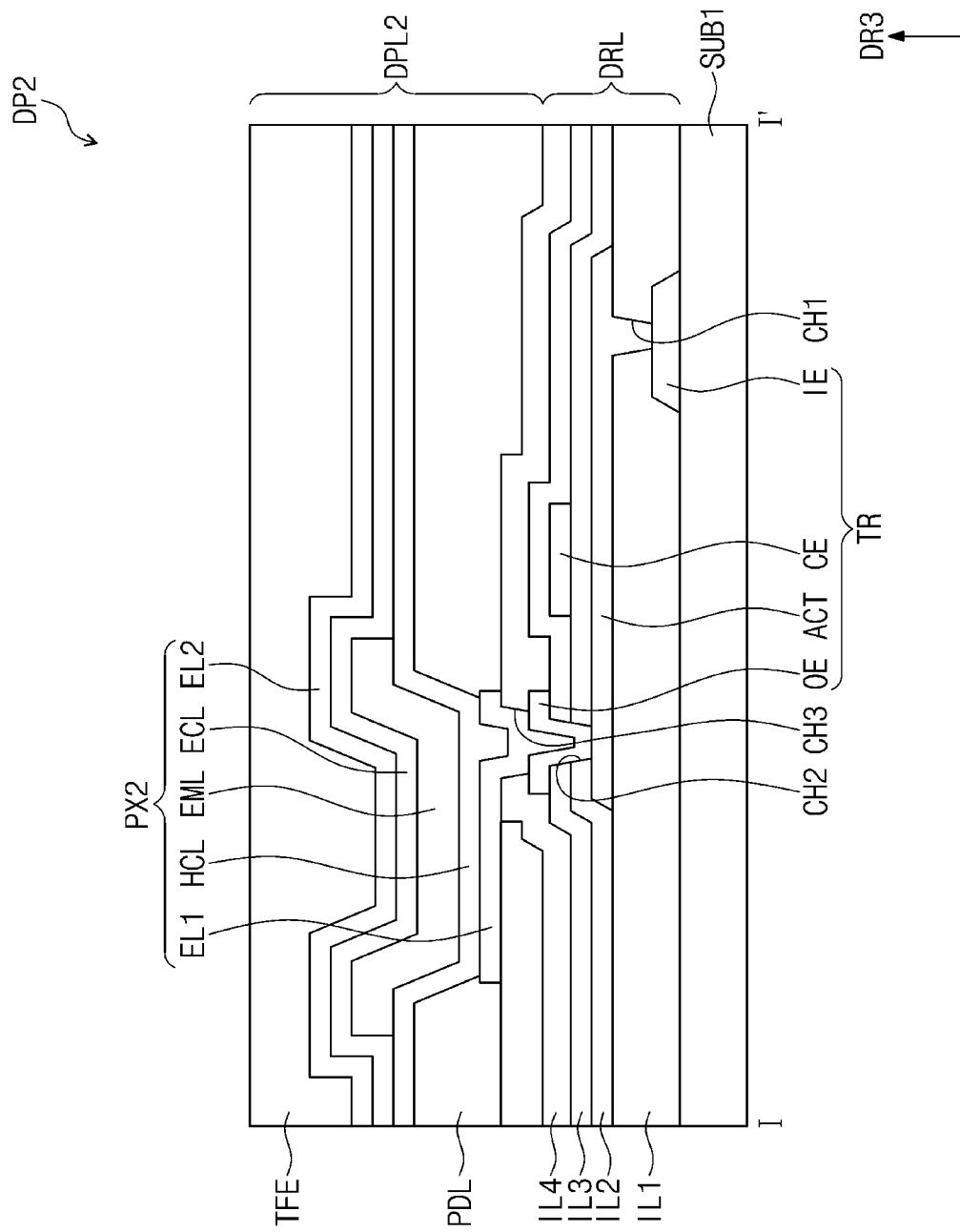
FIG. 11 is a cross-sectional view illustrating a portion of a display panel according to another embodiment of the inventive concept.

FIG. 11 is a cross-sectional view illustrating a portion of a display panel according to another embodiment of the inventive concept.

A display panel DP2 described with reference to FIG. 11 is different from the display panel DP described with reference to FIGS. 4 to 6 in that the display panel DP2 is an organic light emitting display panel, and the rest is substantially the same as each other.

A plurality of display elements PX2 of a display element layer DPL2 may be organic light emitting display elements.

The display element PX2 may include a pixel electrode EL1, a hole control layer HCL, a light emitting layer EML, an electron control layer ECL, and a reference electrode EL2.

The pixel electrode EL1 may be connected to a second electrode OE through a third contact hole CH3 defined in a fourth insulation layer IL4.

The display element layer DPL2 further includes a pixel defining layer PDL. As an opening PDL is defined in the pixel defining layer PDL, at least a portion of the pixel electrode EL1 is exposed.

The hole control layer HCL is disposed on the pixel electrode EL1. The hole control layer HCL may be disposed on the entire base substrate SUB1.

The light emitting layer EML is disposed on the hole control layer HCL. The light emitting layer EML may overlap the pixel electrode EL1. The light emitting layer EML may include an organic material and/or an inorganic material. The light emitting layer EML may generate red light, green light, blue light, or white light. However, the embodiment of the inventive concept is not limited to the color of the generated light. The light emitting layer EML may have a multilayer structure.

The electron control layer ECL is disposed on the light emitting layer EML. The electron control layer ECL may be provided on the entire base substrate SUB1.

The reference electrode EL2 is disposed on the electron control layer ECL. The pixel electrode EL1 may be an anode, and the reference electrode EL2 may be a cathode.

The display element layer DPL2 may include an encapsulation layer TFE disposed on the reference electrode EL2. The encapsulation layer TFE directly covers the reference electrode EL2.

The encapsulation layer TFE may include at least one inorganic encapsulation layer and at least one organic encapsulation layer. The inorganic encapsulation layer and the organic encapsulation layer may be alternately laminated with each other.

Figure 12:
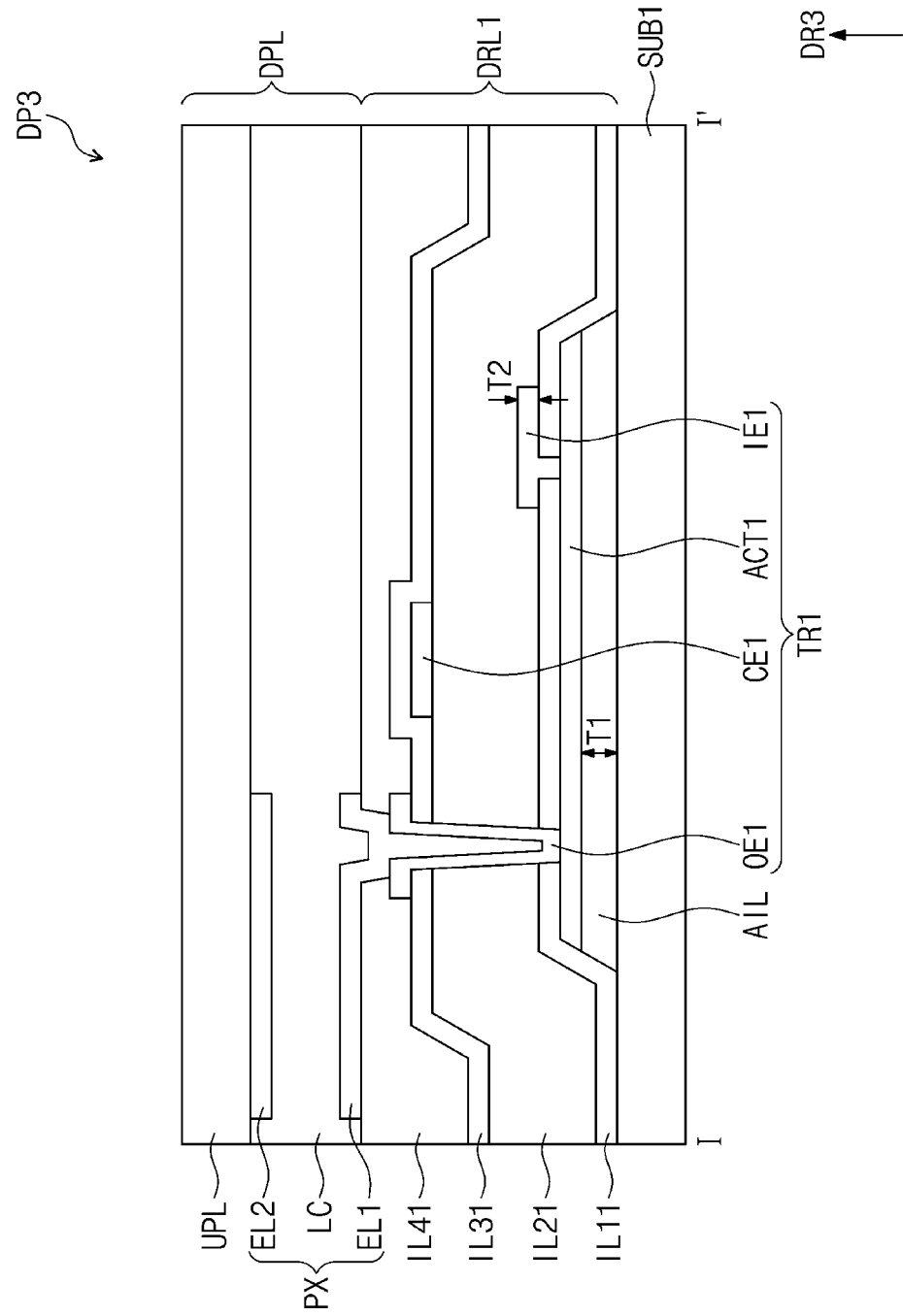
FIG. 12 is a cross-sectional view taken along line I-I' of FIG. 4 according to another embodiment of the inventive concept.
Figure 13:
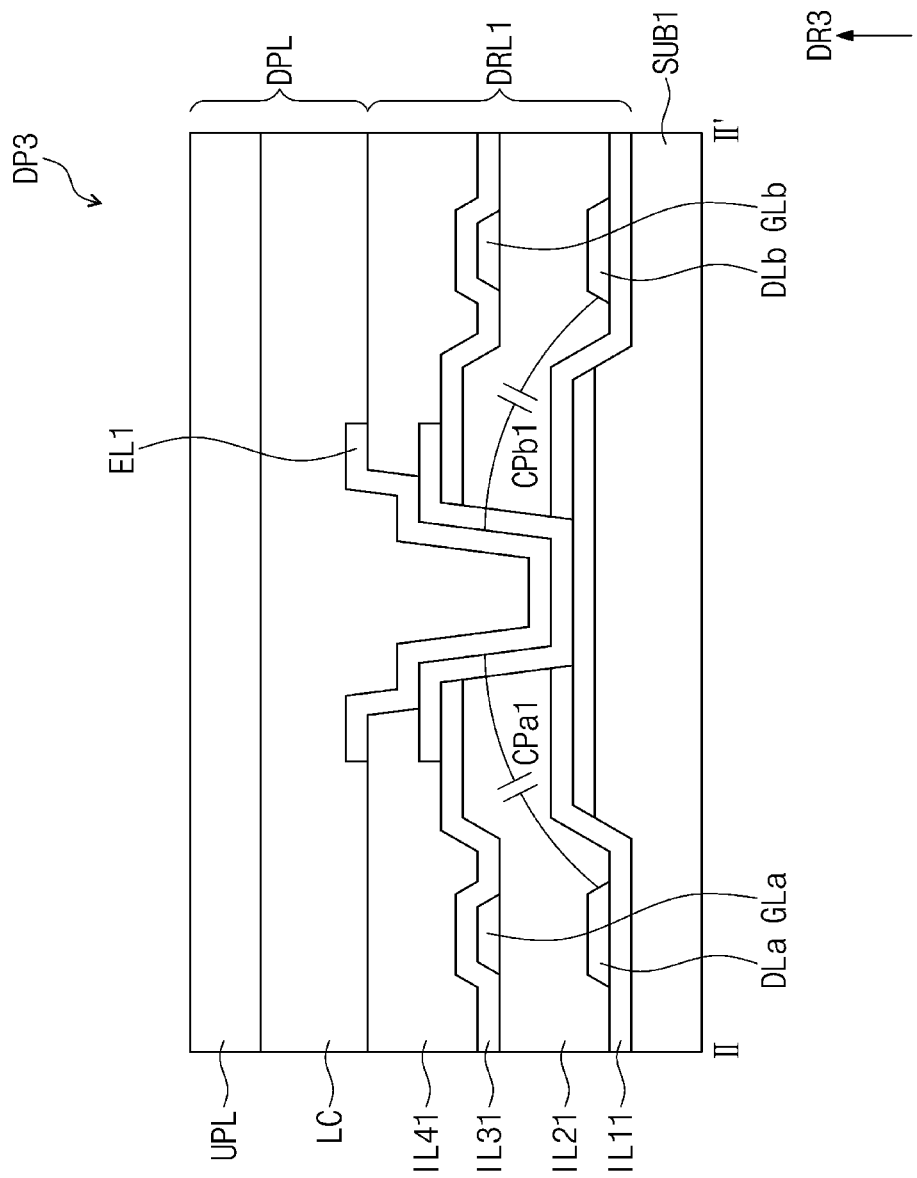
FIG. 13 is a cross-sectional view taken along line II-II' of FIG. 5.

FIG. 12 is a cross-sectional view taken along line of FIG. 4 according to another embodiment of the inventive concept, and FIG. 13 is a cross-sectional view taken along line II-II' of FIG. 5.

A display panel DP3 described with reference to FIGS. 12 and 13 will be mainly described in terms of a different point from the display panel DP described with reference to FIGS. 5 and 6, and components that are not described will comply with the description in FIGS. 5 and 6.

A thin-film transistor TR1 may include a first electrode IE1, a second electrode OE1, an active pattern ACT1, and a control electrode CE1.

Also, a driving element layer DRL1 may include insulation layers disposed between the first electrode IE1, the second electrode OE1, the active pattern ACT1, and the control electrode CE1. In an embodiment of the inventive concept, the driving element layer DRL1 may include first to fourth insulation layers IL11, IL21, IL31, and IL41 and an active insulation layer AIL.

The active insulation layer AIL may be disposed on a base substrate SUB1. The active insulation layer AIL may have a first thickness T1.

The active pattern ACT1 may be disposed on the active insulation layer AIL. Since the active pattern ACT1 has a planar shape that is similar to that of the active pattern ACT described with reference to FIG. 4, detailed description will be omitted.

The first insulation layer IL1 may be disposed on the active pattern ACT1. The first insulation layer IL1 may include a silicon oxide or a silicon nitride.

The first electrode IE1 may be disposed on the first insulation layer IL11. The first electrode IE1 may be connected to a first end of the active pattern ACT1 through a contact hole defined in the first insulation layer IL11. The first electrode IE1 may have a structure having a plurality of layers, e.g., a sequentially laminated structure of Ti/Al/Ti. The first electrode IE1 may have a second thickness T2. The second thickness T2 may be less than the first thickness T1. When the active insulation layer AIL has a thickness relatively greater than that of the first electrode IE1, a capacitance of parasitic capacitors CPa1 and CPb1 between the second electrode OE1 and the first electrode IE1 is easily controlled to be relatively small.

The second insulation layer IL21 may be disposed on the first electrode IE1. The second insulation layer IL21 may include a silicon oxide or a silicon nitride.

The control electrode CE1 may be disposed on the second insulation layer IL21. The control electrode CE1 may overlap the active pattern ACT1.

The third insulation layer IL31 may be disposed on the control electrode CE1. The third insulation layer IL31 may include a silicon oxide or a silicon nitride.

The second electrode OE1 may be disposed on the third insulation layer IL31. The second electrode OE1 may pass through a contact hole defined in the first insulation layer IL11 and the second insulation layer IL21 to contact a second end of the active pattern ACT1.

The fourth insulation layer IL41 may be disposed on the second electrode OE1. The fourth insulation layer IL41 may include a silicon oxide or a silicon nitride.

In the display panel DP3 according to an embodiment of the inventive concept, as the active insulation layer AIL is disposed below the active pattern ACT1, a relative height of each of the active pattern ACT1 and the second electrode OE1 may increase. The increased distance between the first electrode IE1 and the second electrode OE2 may decrease the capacitance of the parasitic capacitors CPa1 and CPb1 in magnitude.

Figure 14:
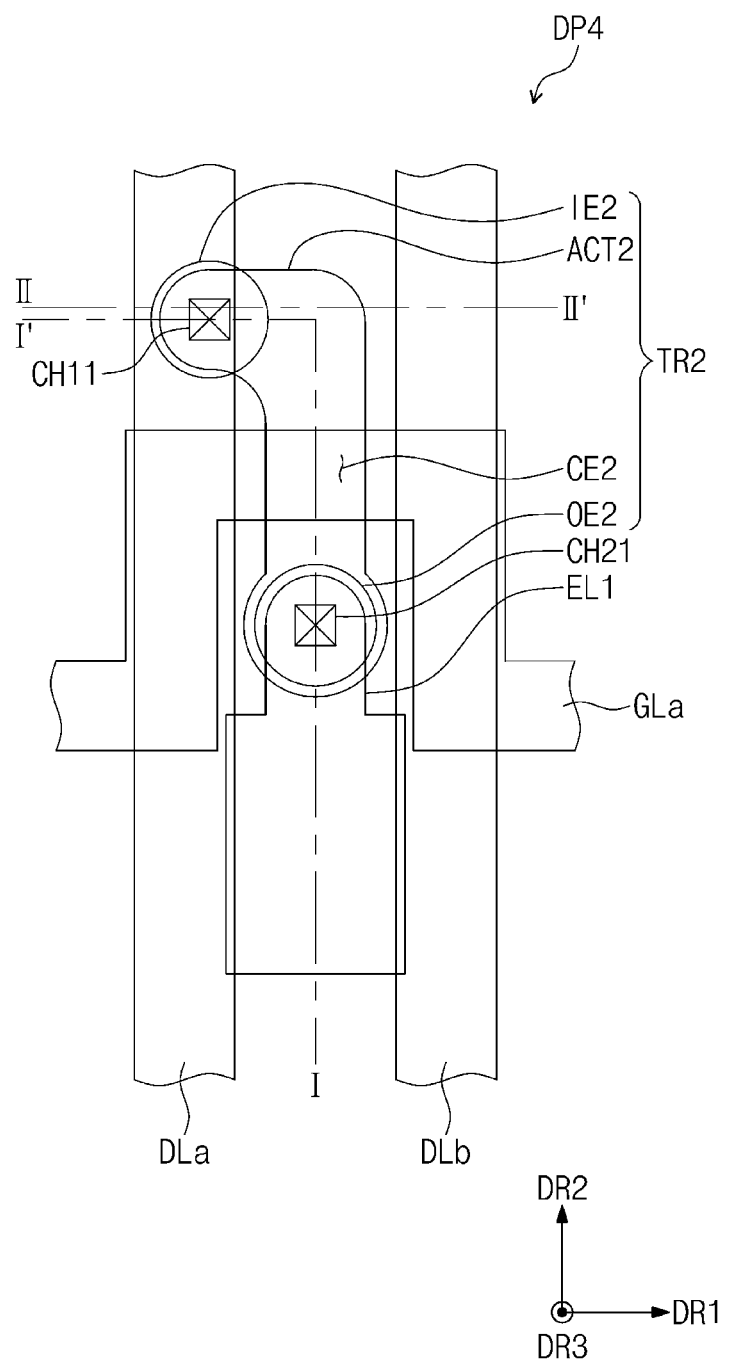
FIG. 14 is an enlarged plan view illustrating a portion of a display panel according to another embodiment of the inventive concept.
Figure 15:
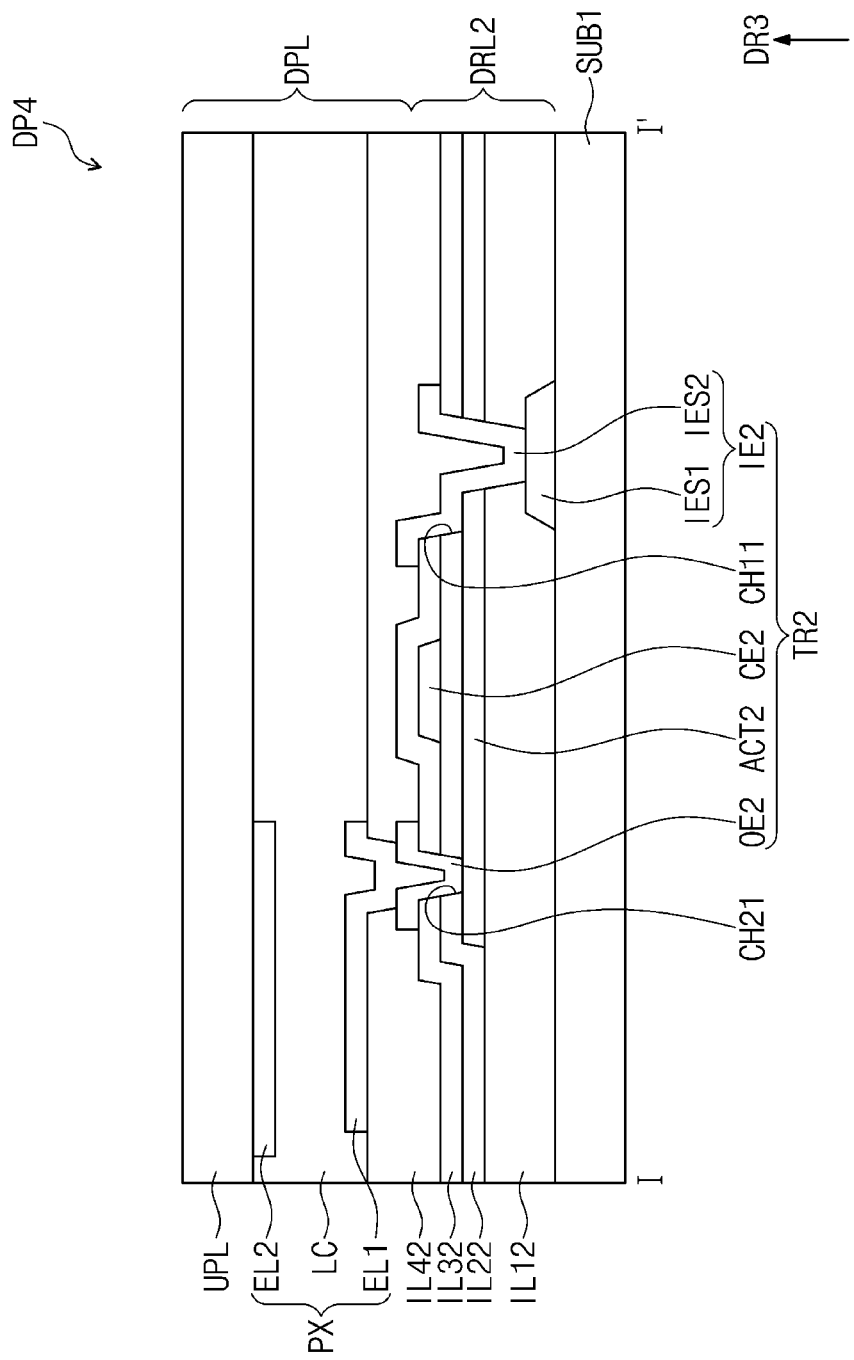
FIG. 15 is a cross-sectional view taken along line I-I' of FIG. 14.
Figure 16:
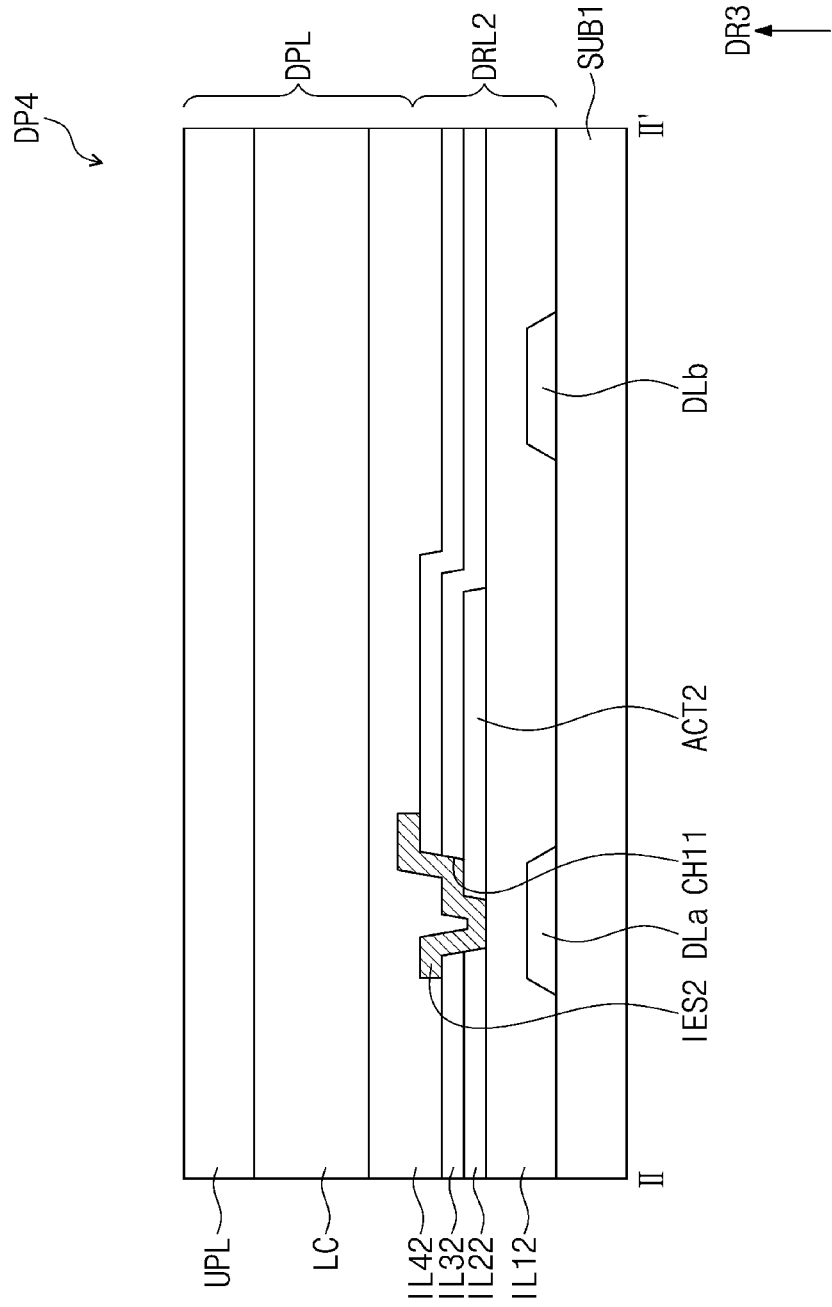
FIG. 16 is a cross-sectional view taken along line II-II' of FIG. 14.

FIG. 14 is an enlarged plan view illustrating a portion of a display panel according to another embodiment of the inventive concept, FIG. 15 is a cross-sectional view taken along line I-I' of FIG. 14, and FIG. 16 is a cross-sectional view taken along line II-II' of FIG. 14.

A display panel DP4 described with reference to FIGS. 14 and 16 will be mainly described in terms of a different point from the display panel DP described with reference to FIGS. 5 and 6, and components that are not described will comply with the description in FIGS. 5 and 6.

A thin-film transistor TR2 may include a first electrode IE2, a second electrode OE2, an active pattern ACT2, and a control electrode CE2.

Also, a driving element layer DRL2 may include insulation layers disposed between the first electrode IE2, the second electrode OE2, the active pattern ACT2, and the control electrode CE2. In an embodiment of the inventive concept, the driving element layer DRL2 may include first to forth insulation layers IL12, IL22, IL32, and IL42.

The first electrode IE2 may include a first sub-electrode IES1 and a second sub-electrode IES2.

The first sub-electrode IES1 may be disposed on a base substrate SUB1. The first sub-electrode IES1 may be disposed on the same layer as data lines DLa and DLb.

The second sub-electrode IES2 may be disposed on the first sub-electrode IES1.

The first insulation layer IL2 may be disposed on the first sub-electrode IES1.

The active pattern ACT2 may be disposed on the first insulation layer IL12. Since the active pattern ACT2 has a planar shape that is similar to that of the active pattern ACT described with reference to FIG. 4, detailed description will be omitted.

The second insulation layer IL22 may be disposed on the active pattern ACT2.

The control electrode CE2 may be disposed on the second insulation layer IL22. The control electrode CE2 may overlap the active pattern ACT2.

The third insulation layer IL32 may be disposed on the control electrode CE2.

The second electrode OE2 and the second sub-electrode IES2 may be disposed on the third insulation layer IL32.

The second sub-electrode IES2 may pass through a contact hole CH11 define din the second insulation layer IL22 and the third insulation layer IL32 and be connected to a first end of the active pattern ACT2. The contact hole CH11 may expose a portion of a top surface of the first sub-electrode IES1 and a portion of a top surface of the active pattern ACT2. The second sub-electrode IES2 may be electrically coupled to the first sub-electrode IES1 and the active pattern ACT2 due to a shape of the contact hole CH11.

The second electrode OE2 may pass through a contact hole CH21 defined in the second insulation layer IL22 and the third insulation layer IL32 and be connected to a second end of the active pattern ACT2.

The fourth insulation layer IL42 may be disposed on the second sub-electrode IES2 and the second electrode OE2.

In the display panel DP4 according to an embodiment of the inventive concept, an electrical connection between the active pattern ACT2 and the first sub-electrode IES1 may be further firmly made by dividing the first electrode IE1 into the first sub-electrode IES1 and the second sub-electrode IES2 and designing the contact hole CH11 to have a shape exposing a portion of the top surface of the active pattern ACT2.

According to the embodiment of the inventive concept, as the layers on which the first electrode and the second electrode are disposed have the different structures, the high-resolution display apparatus may be achieved.

In the embodiment of the inventive concept, as the plurality of insulation layers are disposed between the second electrode and the first electrode, the capacitance of the parasitic capacitors may be controlled to be relatively small, and the vertical crosstalk may be minimized.

In the embodiment of the inventive concept, as the plurality of insulation layers are disposed between the control electrode and the first electrode, the RC delay value of the voltage signal applied to the pixel electrode of the display element may relatively decrease, improving the responding speed and/or the luminance.

In the display panel according to the embodiment of the inventive concept, the contact area between the active pattern and the second electrode may increase, and the contact resistance may decrease.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A display apparatus, comprising:
a base substrate;
an active pattern disposed on the base substrate;
a data line disposed on the base substrate;
a first electrode disposed between the base substrate and the active pattern, and connected to a first end of the active pattern, wherein the first electrode and the data line are disposed on the same layer;
a second electrode disposed on the active pattern, and connected to a second end of the active pattern, wherein the second electrode is disposed on a layer different from the first electrode;
a control electrode overlapping the active pattern, and insulated from the active pattern;
a display element disposed on the second electrode, and connected to the second electrode, and
a pixel electrode connected to the second electrode,
wherein the data line comprises a first data line and a second data line, which are adjacent to each other in a first direction and each of which extends in a second direction crossing the first direction,
wherein the pixel electrode overlaps both of the first data line and the second data line while the active pattern only overlaps the first data line without overlapping the second data line.

2. The display apparatus of claim 1, further comprising a plurality of insulation layers disposed between the first electrode and the second electrode.

3. The display apparatus of claim 1, further comprising:
a first insulation layer disposed between the first electrode and the active pattern;
a second insulation layer disposed between the active pattern and the control electrode;
a third insulation layer disposed between the control electrode and the second electrode; and
a fourth insulation layer disposed between the second electrode and the display element.

4. The display apparatus of claim 3, wherein the first electrode contacts the active pattern through a first contact hole defined in the first insulation layer, and
the second electrode contacts the active pattern through a second contact hole defined in the second insulation layer and the third insulation layer.

5. The display apparatus of claim 3, wherein the first insulation layer is thicker than the first electrode.

6. The display apparatus of claim 1, wherein the control electrode is disposed on the active pattern.

7. The display apparatus of claim 1,
wherein the active pattern extends between the first data line and the second data line.

8. The display apparatus of claim 7, further comprising a gate line crossing the first data line and the second data line in an insulating manner,
wherein the gate line surrounds the second electrode.

9. The display apparatus of claim 7, wherein the second electrode is disposed between the first data line and the second data line.

10. The display apparatus of claim 1, wherein the display element comprises:
a pixel electrode connected to the second electrode;
a reference electrode overlapping the pixel electrode in an insulating manner, and configured to receive a constant voltage; and
a liquid crystal layer configured to change an orientation state of liquid crystal molecules by a voltage applied to the pixel electrode and the reference electrode.

11. The display apparatus of claim 10, further comprising an interlayer insulation layer disposed between the pixel electrode and the reference electrode,
wherein the pixel electrode is disposed on the interlayer insulation layer, and
the liquid crystal layer is disposed on the pixel electrode.

12. The display apparatus of claim 1, further comprising:
a color filter disposed between the second electrode and the display element,
wherein the color filter overlaps the display element.

13. The display apparatus of claim 12, further comprising:
a capping layer disposed between the color filter and the display element, and configured to cover the color filter.

14. The display apparatus of claim 1, further comprising:
at least three insulation layers disposed between the first electrode and the second electrode.

15. A display apparatus, comprising:
a base substrate;
an active pattern disposed on the base substrate;
a data line disposed on the base substrate;
a first electrode disposed on a different layer from the active pattern, and connected to a first end of the active pattern, wherein the first electrode and the data line are disposed on the same layer;
a second electrode disposed on a layer different from the active pattern and from the first electrode, and connected to a second end of the active pattern;
a control electrode overlapping the active pattern, and insulated from the active pattern;
a plurality of insulation layers disposed between the second electrode and the first electrode;
a display element disposed on the second electrode, and connected to the second electrode, and
a pixel electrode connected to the second electrode,
wherein the data line comprises a first data line and a second data line, which are adjacent to each other in a first direction and each of which extends in a second direction crossing the first direction,
wherein the pixel electrode overlaps both of the first data line and the second data line while the active pattern only overlaps the first data line without overlapping the second data line.

16. The display apparatus of claim 15, wherein the second electrode is disposed on the active pattern.

17. The display apparatus of claim 16, wherein the first electrode is disposed below the active pattern.

18. The display apparatus of claim 15, wherein at least three insulation layers are disposed between the second electrode and the first electrode.

19. A display apparatus, comprising:
a base substrate;
an active pattern disposed on the base substrate;
a data line disposed on the base substrate;
a first electrode disposed on a layer different from the active pattern, and connected to a first end of the active pattern, wherein the first electrode and the data line are disposed on the same layer;

a second electrode disposed on a layer different from the active pattern and the first electrode, and connected to a second end of the active pattern;

a control electrode overlapping the active pattern, and insulated from the active pattern;

a display element disposed on the second electrode, and connected to the second electrode;

a first insulation layer disposed between the first electrode and the active pattern;

a second insulation layer disposed between the active pattern and the control electrode;

a third insulation layer disposed between the control electrode and the second electrode;

a fourth insulation layer disposed between the second electrode and the display element and a pixel electrode connected to the second electrode, wherein the data line comprises a first data line and a second data line, which are adjacent to each other in a first direction and each of which extends in a second direction crossing the first direction, wherein the pixel electrode overlaps both of the first data line and the second data line while the active pattern only overlaps the first data line without overlapping the second data line.

20. The display apparatus of claim 19, wherein the control electrode is disposed on the active pattern.

* * * * *